United States Patent
Rygh et al.

(10) Patent No.: US 8,964,547 B1
(45) Date of Patent: Feb. 24, 2015

(54) CREDIT ANNOUNCEMENT

(75) Inventors: Hans Rygh, Oslo (NO); Morten Schanke, Oslo (NO); Marius Hansen, Oslo (NO); Mathias Hoddevik, Langus (NO)

(73) Assignee: Oracle America, Inc., Redwood Shores, CA (US)

( * ) Notice: Subject to any disclaimer, the term of this patent is extended or adjusted under 35 U.S.C. 154(b) by 2150 days.

(21) Appl. No.: 10/863,373

(22) Filed: Jun. 8, 2004

(51) Int. Cl.
    *H04L 1/00* (2006.01)

(52) U.S. Cl.
    USPC .......................................................... 370/235

(58) Field of Classification Search
    USPC .......................................................... 370/235
    See application file for complete search history.

(56) References Cited

U.S. PATENT DOCUMENTS

| | | | |
|---|---|---|---|
| 4,551,833 A | 11/1985 | Turner | |
| 4,896,319 A | 1/1990 | Lidinsky | |
| 5,812,195 A | 9/1998 | Zhang | |
| 5,956,102 A | 9/1999 | Lane | |
| 6,115,376 A | 9/2000 | Sherer | |
| 6,201,829 B1 | 3/2001 | Schneider | |
| 6,222,825 B1 * | 4/2001 | Mangin et al. | 370/235 |
| 6,289,015 B1 | 9/2001 | Warner | |
| 6,304,196 B1 | 10/2001 | Copeland | |
| 6,393,082 B1 | 5/2002 | Nakamura | |
| 6,407,682 B1 | 6/2002 | Jones | |
| 6,459,698 B1 | 10/2002 | Acharya | |
| 6,570,884 B1 | 5/2003 | Connery | |
| 6,606,328 B1 | 8/2003 | Susnow | |
| 6,718,392 B1 | 4/2004 | Krause | |
| 6,839,794 B1 | 1/2005 | Schober | |
| 6,851,059 B1 | 2/2005 | Pfister | |
| 6,898,752 B2 | 5/2005 | Tucker | |
| 6,920,106 B1 | 7/2005 | Chou | |
| 6,922,749 B1 | 7/2005 | Gil | |
| 6,988,161 B2 | 1/2006 | McConnell | |
| 7,010,607 B1 | 3/2006 | Bunton | |
| 7,020,160 B1 | 3/2006 | Achler | |
| 7,061,899 B2 | 6/2006 | Walker | |
| 7,072,343 B1 | 7/2006 | Waclawsky | |
| 7,103,626 B1 | 9/2006 | Recio | |
| 7,113,995 B1 | 9/2006 | Beukema | |
| 7,124,241 B1 | 10/2006 | Reeve | |

(Continued)

FOREIGN PATENT DOCUMENTS

| | | |
|---|---|---|
| WO | 02089405 A2 | 11/2002 |
| WO | 03075477 A2 | 9/2003 |

OTHER PUBLICATIONS

3GPP Infiniband Specification Release 1.0a, Jun. 19, 2001, pp. 2, 62, 71, 155-156, 182-186 and 193-194.*

(Continued)

*Primary Examiner* — Jianye Wu
(74) *Attorney, Agent, or Firm* — Park, Vaughan, Fleming & Dowler LLP

(57) ABSTRACT

An Infiniband port can be provided. The port can have an input buffer for storing received data, a flow control manager operable to detect an available space in the input buffer, and a packet generator operable to generate a flow control packet to advertise available space in the input buffer to a remote device transmitting data for storage in the input buffer. The flow control manager can be operable to trigger the packet generator to generate a flow control packet on the basis of at least one of a timer, a received data quantity characteristic for the input buffer and a buffer utilization characteristic for the input buffer.

26 Claims, 7 Drawing Sheets

(56) References Cited

U.S. PATENT DOCUMENTS

| | | | |
|---|---|---|---|
| 7,133,409 B1 | 11/2006 | Willardson | |
| 7,150,021 B1 | 12/2006 | Vajhala | |
| 7,180,862 B2 | 2/2007 | Peebles | |
| 7,185,062 B2 | 2/2007 | Lolayekar | |
| 7,221,650 B1* | 5/2007 | Cooper et al. | 370/236 |
| 7,225,467 B2 | 5/2007 | Dapp | |
| 7,237,016 B1* | 6/2007 | Schober | 709/223 |
| 7,245,627 B2 | 7/2007 | Goldenberg | |
| 7,302,432 B2 | 11/2007 | Brown | |
| 7,474,666 B2 | 1/2009 | Kloth | |
| 7,493,409 B2 | 2/2009 | Craddock | |
| 2001/0037435 A1 | 11/2001 | Van Doren | |
| 2001/0056553 A1 | 12/2001 | Suzuki | |
| 2002/0057699 A1 | 5/2002 | Roberts | |
| 2002/0087383 A1 | 7/2002 | Cogger | |
| 2002/0101967 A1 | 8/2002 | Eng | |
| 2002/0118692 A1 | 8/2002 | Oberman | |
| 2002/0147947 A1 | 10/2002 | Mayweather | |
| 2002/0150106 A1 | 10/2002 | Kagan | |
| 2002/0181455 A1 | 12/2002 | Norman | |
| 2003/0005039 A1 | 1/2003 | Craddock | |
| 2003/0021230 A1 | 1/2003 | Kuo | |
| 2003/0061379 A1 | 3/2003 | Craddock | |
| 2003/0079019 A1 | 4/2003 | Lolayekar | |
| 2003/0093627 A1 | 5/2003 | Neal | |
| 2003/0161429 A1 | 8/2003 | Chiang | |
| 2003/0188056 A1 | 10/2003 | Chemudupati | |
| 2003/0193942 A1 | 10/2003 | Gil | |
| 2003/0198251 A1 | 10/2003 | Black | |
| 2003/0200315 A1 | 10/2003 | Goldenberg | |
| 2003/0223416 A1* | 12/2003 | Rojas et al. | 370/389 |
| 2003/0223435 A1 | 12/2003 | Gil | |
| 2003/0223453 A1 | 12/2003 | Stoler | |
| 2003/0236900 A1 | 12/2003 | Chu | |
| 2004/0001487 A1 | 1/2004 | Tucker | |
| 2004/0001503 A1* | 1/2004 | Manter | 370/462 |
| 2004/0022245 A1 | 2/2004 | Forbes | |
| 2004/0022257 A1 | 2/2004 | Green | |
| 2004/0024903 A1 | 2/2004 | Costatino | |
| 2004/0039986 A1 | 2/2004 | Solomon | |
| 2004/0071134 A1 | 4/2004 | Vadivelu | |
| 2004/0073534 A1 | 4/2004 | Robson | |
| 2004/0081394 A1 | 4/2004 | Biran | |
| 2004/0085977 A1 | 5/2004 | Gaur | |
| 2004/0120254 A1 | 6/2004 | Rider | |
| 2004/0213224 A1 | 10/2004 | Goudreau | |
| 2004/0215848 A1 | 10/2004 | Craddock | |
| 2004/0225734 A1 | 11/2004 | Schober | |
| 2004/0252685 A1 | 12/2004 | Kagan | |
| 2005/0011465 A1 | 1/2005 | Park | |
| 2005/0058150 A1 | 3/2005 | Boles | |
| 2005/0071472 A1 | 3/2005 | Arndt | |
| 2005/0108395 A1 | 5/2005 | Brey | |
| 2005/0138368 A1 | 6/2005 | Sydir | |

OTHER PUBLICATIONS

InfiniBand Architecture, Specification vol. 1, Release 1.0.a, Jun. 19, 2001, pp. 2, 62, 71, 155-156, 182-186 and 193-194.*

InfiniBand Architecture, Specification vol. 1, Release 1.0.a, Jun. 19, 2001, pp. 99.*

XILINX: "Virtex-II Pro Platform FPGAs: Functional Description", Product Specification, Dec. 10, 2003, pp. 1-5, XP-002348226.

PCT International Search Report for International Application No. PCT/US2005/016775, 4 pages.

Written Opinion of the International Search Authority for International Application No. PCT/US2005/016775, 5 pages.

Bu, Long et al., "A Keyword Match Processor Architecture using Content Addressable Memory", GLSVLSI'04, Apr. 26-28, 2004, Boston, Massachusetts, ACM, pp. 372-376.

"InfiniBand Architecture Specification vol. 2, Release 1.1", Nov. 6, 2002.

"InfiniBand Architecture Specification vol. 1, Release 1.1", Nov. 6, 2002.

* cited by examiner

CREDIT ANNOUNCEMENT

RELATED APPLICATIONS

The present application is related to the following applications, all of which are filed on the same day and assigned to the same assignee as the present application:

"METHOD AND APPARATUS FOR VERIFYING SERVICE LEVEL IN A COMMUNICATIONS NETWORK" (Ser. No. 10/863,019), Inventors: Bjorn Dag Johnsen, Christopher Jackson, David Brean and Ola Torudbakken;

"SWITCH METHOD AND APPARATUS WITH CUT-THROUGH ROUTING FOR USE IN A COMMUNICATIONS NETWORK" (Ser. No. 10/863,016), Inventors: Bjorn Dag Johnsen, Hans Rygh and Morten Schanke;

"SWITCHING METHOD AND APPARATUS FOR USE IN A COMMUNICATIONS NETWORK" (Ser. No. 10/862,970), Inventors: Bjorn Dag Johnsen, Christopher Jackson, David Brean, Ola Torudbakken, Steinar Forsmo, Hans Rygh, Morten Schanke;

"METHOD AND APPARATUS FOR SOURCE AUTHENTICATION IN A COMMUNICATIONS NETWORK" (Ser. No. 10/863,854), Inventors: Bjorn Dag Johnsen, Christopher Jackson, David Brean, Ola Torudbakken;

"ADAPTIVE CUT-THROUGH ALGORITHM" (Ser. No. 10/862,987), Inventors: Morten Schanke, Brian Manula and Magne Sandven;

"COMMA DETECTION" (Ser. No. 10/863,374), Inventors: Magne Sandven, Morten Schanke and Brian Manula;

"SERVICE LEVEL TO VIRTUAL LANE MAPPING" (Ser. No. 10/862,985), Inventors: Steinar Forsmo, Hans Rygh and Ola Torudbakken;

"INPUT AND OUTPUT BUFFERING" (Ser. No. 10/863,038), Inventors: Hans Rygh, Morten Schanke, Ola Torudbakken and Steinar Forsmo;

"CODEC IMPLEMENTATION FOR INFINIBAND" (Ser. No. 10/863,439), Inventors: Steinar Forsmo, Mathias Hoddevik and Magne Sandven;

"VCRC CHECKING AND GENERATION" (Ser. No. 10/863,013), Inventors: Steinar Forsmo, Hans Rygh, Morten Schanke and Ola Torudbakken;

"COMMUNITY SEPARATION ENFORCEMENT" Ser. No. 10/863,544, Inventors: Ola Torudbakken and Bjorn Dag Johnsen;

"STUMPING MECHANISM" Ser. No. 10/863,372, Inventors: Brian Manula, Ali Bozkaya and Magne Sandven.

The above-identified applications are all hereby incorporated by reference into the present application.

FIELD

The present invention relates to credit announcement, and in particular but not exclusively to an adaptive credit announcement method and apparatus for an Infiniband device such as a switch.

INTRODUCTION

In Infiniband™ networks, there is a general requirement to reduce the latency through the network and increase the efficiency of devices in the network such that transmission times of packets across the network can be reduced through maximisation of bandwidth through a system. One possible source of inefficiency in an Infiniband network is flow control over each physical link. In some Infiniband devices, the implementation of flow control is highly inefficient and significantly reduces the data bearing performance of that link.

SUMMARY OF THE INVENTION

The present invention has been made, at least in parts, in consideration of problems and drawbacks of conventional systems.

Viewed from a first aspect, the present invention provides an Infiniband port. The port can have an input buffer for storing received data, a flow control manager operable to detect an available space in the input buffer, and a packet generator operable to generate a flow control packet to advertise available space in the input buffer to a remote device transmitting data for storage in the input buffer. The flow control manager can be operable to trigger the packet generator to generate a flow control packet on the basis of at least one of a timer, a received data quantity characteristic for the input buffer and a buffer utilisation characteristic for the input buffer. This arrangement provides a port operable to maximise the efficiency of transmission of data over an Infiniband link to ensure maximum data throughput across the link, thereby making optimal use of received data storage at the port and minimising output resource contention at the transmitting node. Thereby the efficiency of a fabric incorporating the port can be increased.

Viewed from a second aspect the present invention provides an Infiniband port. The port can comprise: a buffer for storing data received at the port; a flow control manager unit for monitoring the buffer and determining a correct time to transmit a flow control message to a transmitting entity of data received at the port; a packet generator unit for generating a flow control packet in response to an input from the flow control manager unit. The flow control manager unit can be operable to determine the correct time using a combination of a timer trigger mechanism, an amount received trigger mechanism and an amount change trigger mechanism. This arrangement provides a port operable to maximise the efficiency of transmission of data over an Infiniband link to ensure maximum data throughput across the link, thereby making optimal use of received data storage at the port and minimising output resource contention at the transmitting node. Thereby the efficiency of a fabric incorporating the port can be increased.

Viewed from a third aspect, the present invention provides a method for controlling flow of data to an Infiniband port. The method can comprise: monitoring a status of an input buffer of the port; determining, on the basis of at least one of a timer, an amount received and a change quantity, a most appropriate time to generate a flow control message to send to an originator of data received at the port and stored in the buffer; and generating a flow control message to advertise available input buffer space to the originator. This method allows the optimisation of data transfer over an Infiniband link, thereby improving resource utilisation efficiency and providing for faster transfer of data through an Infiniband fabric.

Particular and preferred aspects and embodiments of the invention are set out in the appended independent and dependent claims.

BRIEF DESCRIPTION OF FIGURES

Specific embodiments of the present invention will now be described by way of example only with reference to the accompanying figures in which.

Figure 1:
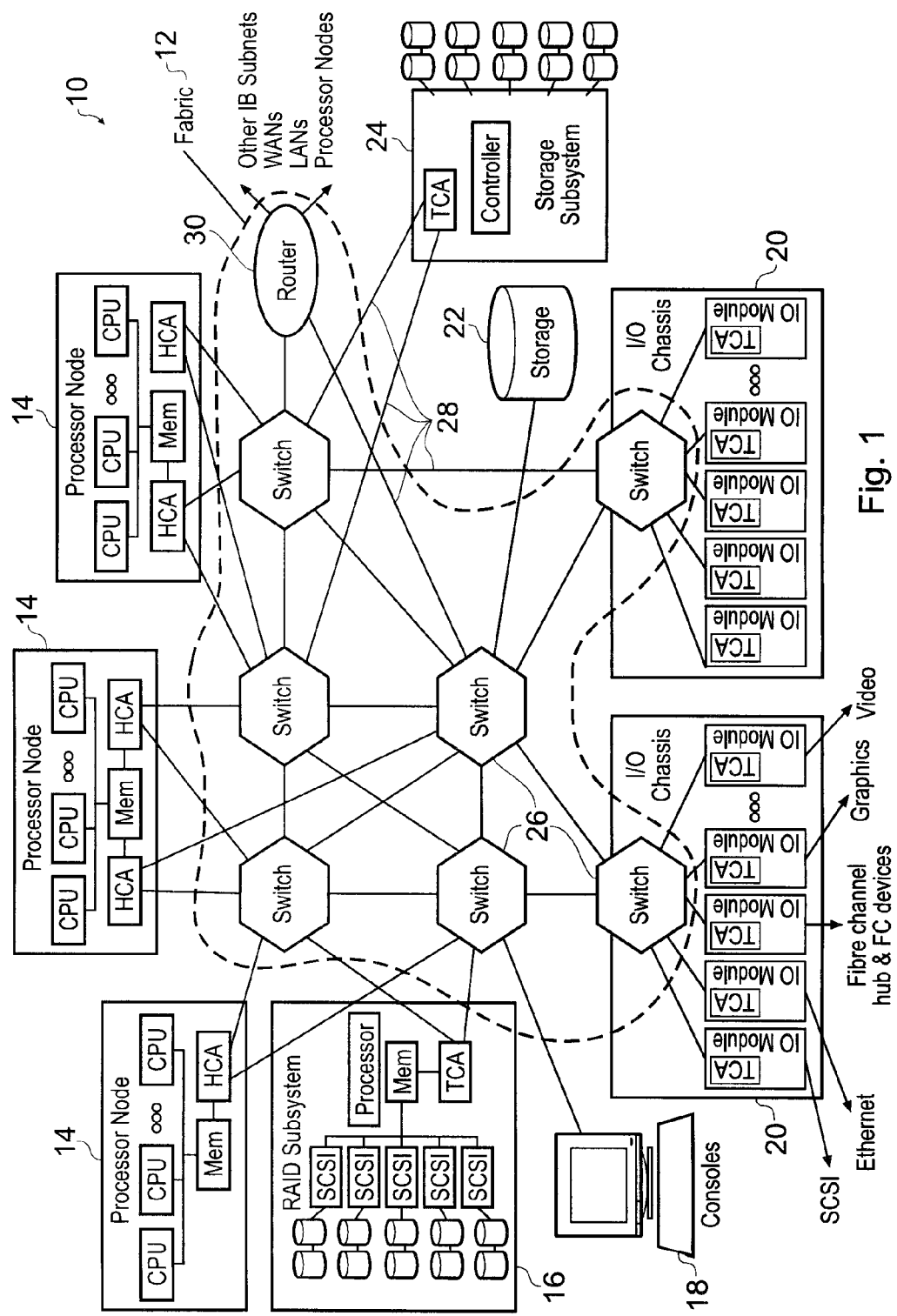
FIG. 1 is a schematic block diagram showing an example of interconnection of computing system elements via the Infiniband™ networking architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF SPECIFIC EMBODIMENTS

One particular computer networking architecture is the Infiniband™ architecture. Infiniband™ is a standard architecture defined and administered by the Infiniband™ Trade Association, which was founded by Compaq, Dell, Hewlett-Packard, IBM, Intel, Microsoft and Sun Microsystems. The Infiniband™ Architecture defines a System Area Network (SAN) for connecting multiple independent processor platforms (i.e. host processor nodes), I/O platforms and I/O devices. A full definition of the Infiniband™ Architecture may be found in the Infiniband™ Architecture Specification Volumes 1 and 2, available from the Infiniband™ Trade Association. Infiniband™ defines a standard for flexible and high speed interconnect between computing systems or parts of computing system such as processor and I/O nodes. Infiniband™ allows an order of magnitude more flexibility and scalability than conventional bus based systems through a highly hardware coupled and low latency interface, which is a key factor in multiprocessing architectures.

The Infiniband™ Architecture SAN is a communications and management infrastructure supporting both I/O and interprocessor communications for one or more computer systems. An Infiniband™ Architecture system can range from a small server with one processor and a few I/O devices to a massively parallel supercomputer installation with hundreds of processors and thousands of I/O devices.

The Infiniband™ Architecture defines a switched communications fabric allowing many devices to concurrently communicate with high bandwidth and low latency in a protected, remotely managed environment. An endnode can communicate with over multiple Infiniband™ Architecture ports and can utilise multiple paths through the Infiniband™ Architecture fabric. A multiplicity of Infiniband™ Architecture ports and paths through the network are provided for both fault tolerance and increased data transfer bandwidth.

Infiniband™ Architecture hardware off-loads from the CPU much of the I/O communications operation. This allows multiple concurrent communications without the traditional overhead associated with communicating protocols. The Infiniband™ Architecture SAN provides its I/O and interprocessor communications clients zero processor-copy data transfers, with no kernel involvement, and uses hardware to provide highly reliable, fault tolerant communications.

An example of an Infiniband™ Architecture System Area Network is shown in FIG. 1. As can be seen from FIG. 1, a System Area Network 10 comprises an Infiniband™ Architecture fabric (or Subnet) 12 made up of cascaded switches and routers. The fabric 12 provides links between a number of processor nodes 14 and other nodes including a Raid Subsystem 16, consoles 18, I/O Chassis 20, Storage 22 and a Storage Subsystem 24. The Fabric 12 is made up of a plurality of switches 26 having interconnections 28 providing data connections therebetween and between the nodes attached to the fabric 12. Also comprised in the fabric 12 is a router 30 for providing connections to and from other networks, which may be other Infiniband™ Architecture subnets, non-Infiniband™ Architecture LANs and WANs and/or processor nodes. I/O units connected via the fabric 12 may range in complexity from single ASIC devices such as a SCSI (small computer systems interface) or LAN adapter to large memory rich RAID subsystems that rival a processor node in complexity. Collectively, the processor nodes 14, raid subsystems 16, consoles 18, I/O Chassis 20, Storage 22 and Storage Subsystems 24 are known as endnodes 32.

Each endnode 32 has therein a Channel Adapter, which may be a Host Channel Adapter (HCA) or a Target Channel Adapter (TCA). Host Channel Adapters are to be found in processor nodes 14, and Target Channel Adapters are to be found in I/O Nodes 16, 18, 20, 22 and 24. Host Channel Adapters are configured to issue requests across the fabric 12, and Target Channel Adapters are configured to respond to such requests, for example by supplying requested data or storing supplied data. Each Channel Adapter uses a queuing system based on Queue Pairs, one queue for send operations and one for receive operations. Each Queue Pair may therefore be considered to provide a virtual communication port of a Channel Adapter. Each Channel Adapter may have up to $2^{24}$ Queue Pairs, which may be assigned individually or in combination to handle operations affecting different parts (or consumers) of the endnode 32. For example, a processor node 16 may comprise a plurality of processors and each processor may have one or more individual Queue Pairs assigned to handle requests and responses flowing to and from that processor of that processor node 16 via the fabric 12. Alternatively, or in addition, a processor of a given processor node 16 may be running more than one process and each process may have one or more Queue Pairs assigned to handle requests and responses flowing to and from that process via the fabric 12.

The interconnects 28 may be one of three classes, 1x, 4x or 12x, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
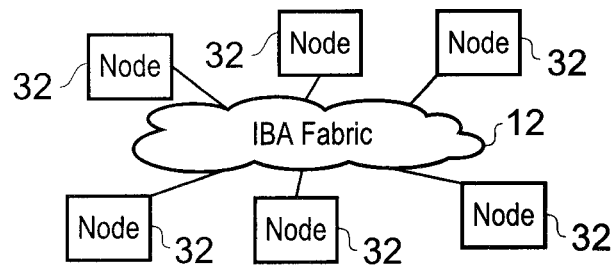
FIG. 2 is a schematic block diagram of a simplified arrangement of an Infiniband™ Architecture system.
Figure 3:
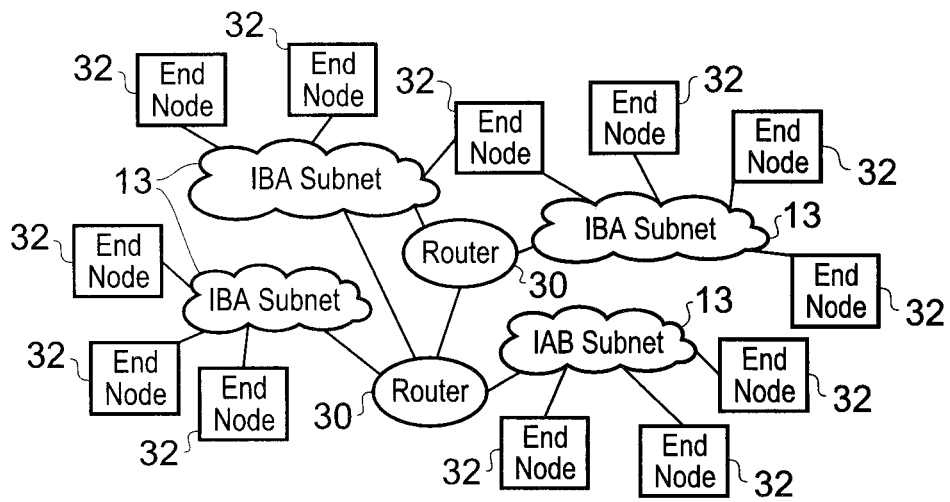
FIG. 3 is a schematic block diagram of another simplified arrangement of an Infiniband™ Architecture system.
Figure 4:
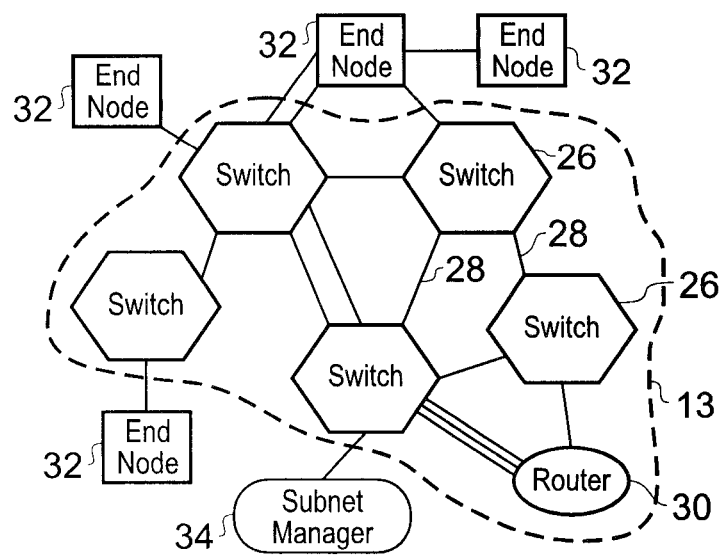
FIG. 4 is a schematic block diagram of a further simplified arrangement of an Infiniband™ Architecture system.

Examples of possible Infiniband™ Architecture topologies are shown in FIGS. 2, 3 and 4. FIG. 2 shows a high level simplified topology example where a number of endnodes 32 are interconnected by the fabric 12. An Infiniband™ Architecture network may be subdivided into subnets 13 interconnected by routers 30 as illustrated in FIG. 3. Any particular endnode 32 may be attached to a single subnet 13 or to multiple subnets 13. Shown in FIG. 4 is an example of the structure of a subnet 13. The subnet 13 comprises endnodes 32, switches 26, routers 30 and subnet managers 34 interconnected by links 28. Each endnode 32 may attach to a single switch 26, multiple switches 26 and/or directly with each other. In the case of direct connection between endnodes 32, the two or more directly linked endnodes effectively form an independent subnet with no connectivity to the remainder of the devices attached to the main subnet and one of the interconnected endnodes functions as the subnet manager for that link.

Figure 5:
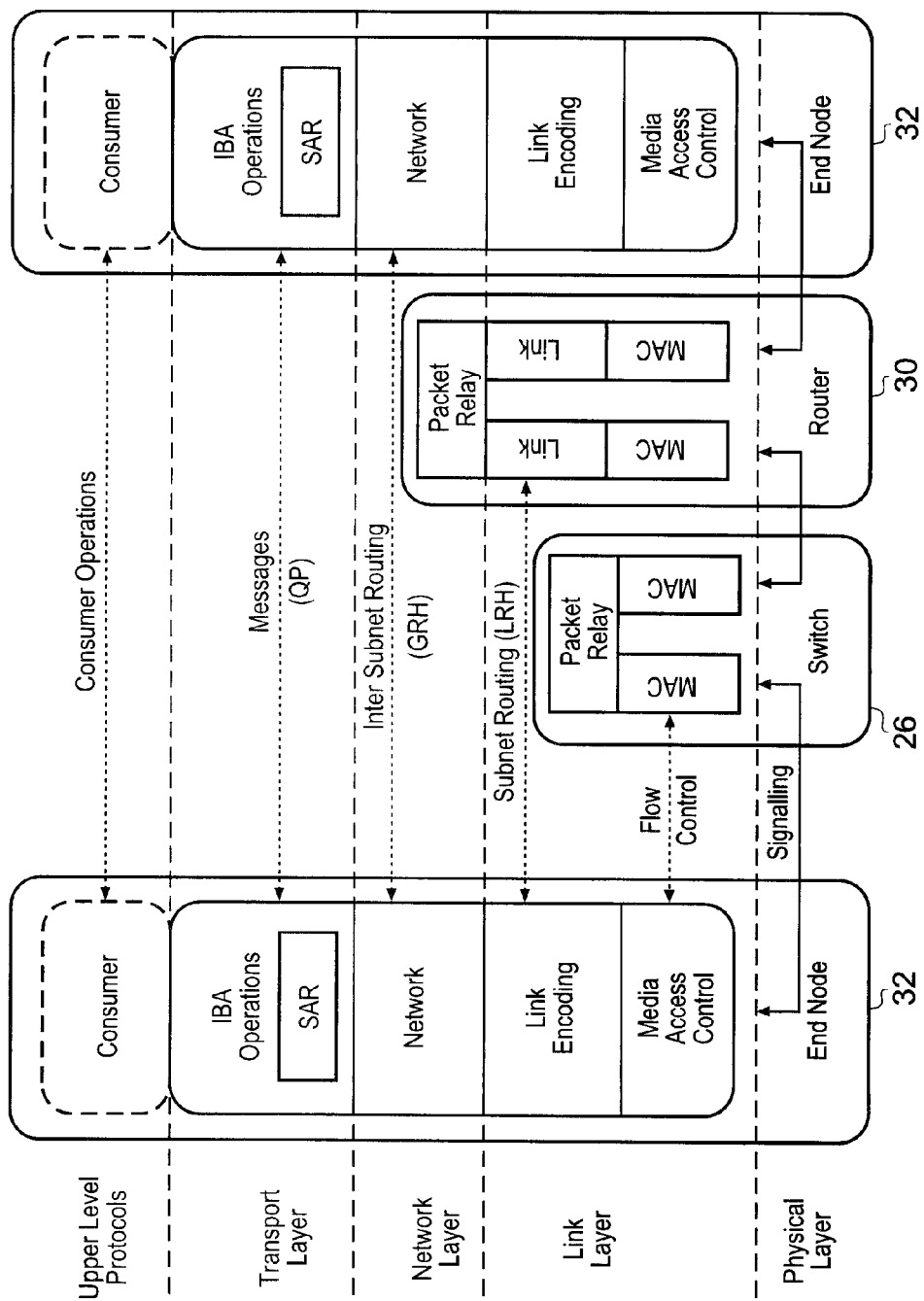
FIG. 5 shows a schematic illustration of the architecture layers of an Infiniband™ Architecture system.

Referring now to FIG. 5, there is shown an illustration of the architecture layers of an Infiniband™ Architecture system. Starting with the physical layer, this specifies how bits are placed onto the interconnections 28 and defines the symbols used for framing (i.e. start of packet and end of packet), data symbols and fill between packets (idles). It also specifies the signalling protocol as to what constitutes a validly formed packet (i.e. symbol encoding, proper alignment of framing symbols, no invalid or non-data symbols between start and end delimiter, no disparity errors, synchronisation method, etc.). The signalling protocol used by the Infiniband™ Architecture utilises a differential signal. The physical (or ethereal) interconnects 28 between nodes of an Infiniband™ Architecture network are normally provided by electrical signal carriers such as copper cables or optical signal carriers such as optical fibres. As discussed above, the maximum data rate of the interconnect is limited by the bandwidth of the selected channel. The physical layer also includes deskewing circuitry for compensating for skew latency in the channels.

Figure 6:
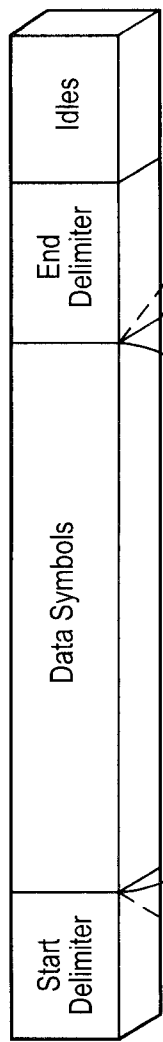
FIG. 6 shows schematically the structure of a message to be transmitted via an Infiniband™ Architecture.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
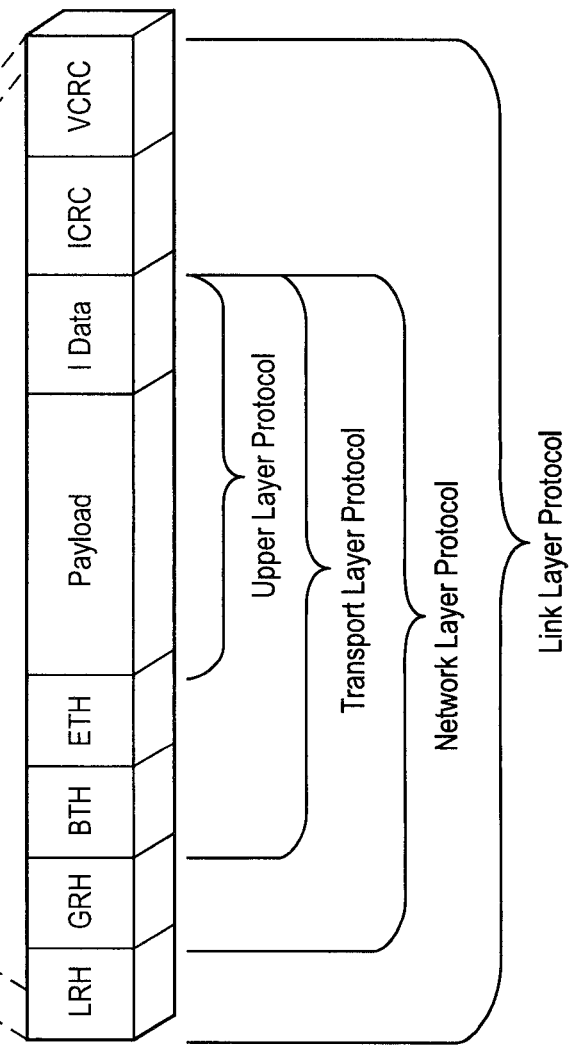
FIG. 7 shows schematically the format of a packet of the message of FIG. 6.

The data packet format is illustrated in FIG. 7. Packets may be one of two types, IBA (Infiniband™ Architecture) Packets or RAW (non-Infiniband™ Architecture) Packets. IBA Packets have IBA defined transport headers, are routed on Infiniband™ Architecture fabrics 12, and use native Infiniband™ Architecture transport facilities. Raw Packets may be routed on IBA fabrics but do not contain Infiniband™ Architecture transport headers. From the Infiniband™ point of view, these packets contain only Infiniband™ routing headers, payload and CRC. Infiniband™ Architecture does not define the processing of these packets above the link and network layers. These packets can be used to support non-Infiniband™ Architecture transports (e.g. TCP/IP, IPX/SPX, NetBUI etc) over an Infiniband™ fabric.

The Link Layer describes the packet format and protocols for packet operation, e.g. flow control and how packets are routed within a subnet between the source and the destination. Packets may be data packets which convey data between endnodes and which consist of a number of different headers which may or may not be present. Alternatively packets may be Link Management Packets which are used to train and maintain link operation. These packets are used to negotiate operational parameters between the ports at each end of the link such as bit rate, link width etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted. The terms "transmitter" and "receiver" are utilised to describe each end of a given link. The transmitter is the node sending data packets. The receiver is the consumer of the data packets. Each end of the link has a transmitter and a receiver. The Infiniband™ Architecture utilises an "absolute" credit based flow control scheme that is to say that Infiniband™ Architecture receivers provide a "credit limit". A credit limit is an indication of the total amount of data that the transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband™ Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the Link Layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The Network Layer, which is present only within routers 30 and endnodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header but the source and destination port identities are not changed and are protected by the Invariant Cyclic Redundancy Check. Thus the Network and Link Layers operate together to deliver a packet to the desired destination.

The Transport Layer, which is present only within endnodes 32, delivers the packet to the proper Queue Pair within the Channel Adapter of the destination endnode 32 and instructs that Queue Pair as to how the packet's data should be processed. The transport layer also has responsibility for segmenting an operation into multiple packets when the message's data payload is greater than the maximum payload carryable by a single packet. The receiving Queue Pair then reassembles the data from the multiple packets at the destination endnode 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write etc). A number of Extended Transport Headers (ETH) may be present conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver endnode 32 may transmit and acknowledge signal back to the originator endnode to indicate whether all packets have been received successfully.

The Upper Level Protocols are completely software based and may comprise any number of protocols used by various user consumers. The payload is the data carried by the packet and I Data is handling data associated with a work activity to be performed on the payload. Also present in the Upper Level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an endnode 32.

Figure 8:
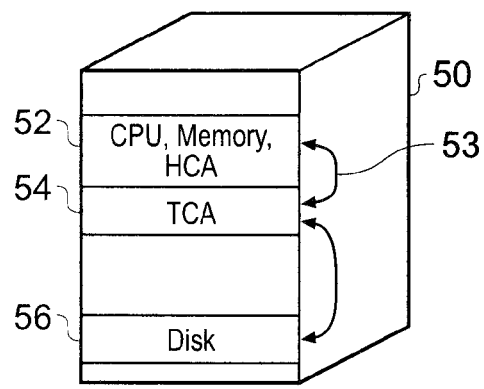
FIG. 8 is a schematic block diagram showing an arrangement where the Infiniband™ Architecture is used to interconnect components within a computer system.
Figure 9:
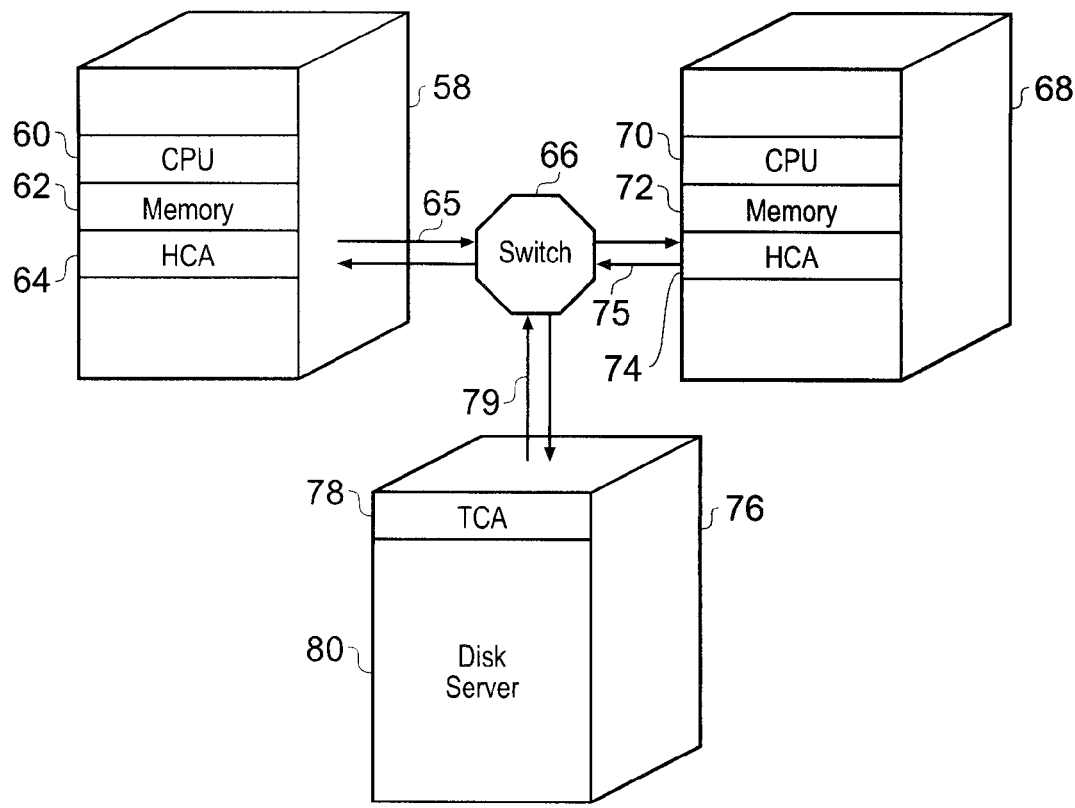
FIG. 9 is a schematic block diagram showing an arrangement where the Infiniband™ Architecture is used as an interconnect between computer systems.

Examples of simple Infiniband™ Architecture systems are shown in FIGS. 8 and 9. FIG. 8 shows an arrangement where the Infiniband™ Architecture is used to interconnect components within a standard computer system rack 50. In this example, the CPU, Memory and a Host Channel Adapter 52 are interconnected using conventional non-Infiniband™ Architecture techniques. The Host Channel Adapter of the CPU, Memory and Host Channel Adapter 52 communicates via an Infiniband™ Architecture interconnect 53 with a Target Channel Adapter 54. The Target Channel Adapter 54 communicates with a disk drive unit 56 via a SCSI (Small Computer System Interface) connection. Thus the Infiniband™ Architecture is configured in this example to facilitate communications between elements of the same computer system.

FIG. 9 shows an arrangement where the Infiniband™ Architecture is used only as an interconnect between computers. In this example a first computer system is mounted in a rack 58 and comprises a CPU 60, memory 62 and a Host Channel Adapter 64 interconnected via conventional non-Infiniband™ Architecture techniques. Via the Host Channel adapter 64, the first computer system communicates to and from a Switch 66 across interconnects 65. Also connected to the Switch 66 is a second computer system mounted in a rack 68 and comprising a CPU 70, memory 72 and a Host Channel Adapter 74 which connects to the switch 66 via interconnects 75. Data storage for the first and second computer systems is provided by a disk server 80 mounted in a rack 76. The disk server 80 connects with a Target Channel Adapter 78 also mounted within the rack 76 by conventional non-Infiniband™ Architecture techniques. The Target Channel Adapter 78 connects to the switch 66 via interconnects 79. Thus the Infiniband™ Architecture is configured in this example to facilitate communication between more than two distinct computer systems. There is no limitation that the techniques of the examples of FIGS. 8 and 9 should be practised separately, a computer system using the Infiniband™ Architecture for internal communications may also be connected to other computer systems via a network based on the Infiniband™ Architecture.

Thus there has now been described an overview of the Infiniband™ Architecture for computer networking with examples of how it may be put into practice. Further details may be found in the above referenced Infiniband™ Architecture Specification Volumes 1 and 2, available from the Infiniband™ Trade Association, the contents of which are hereby incorporated hereinto by reference.

Figure 10:
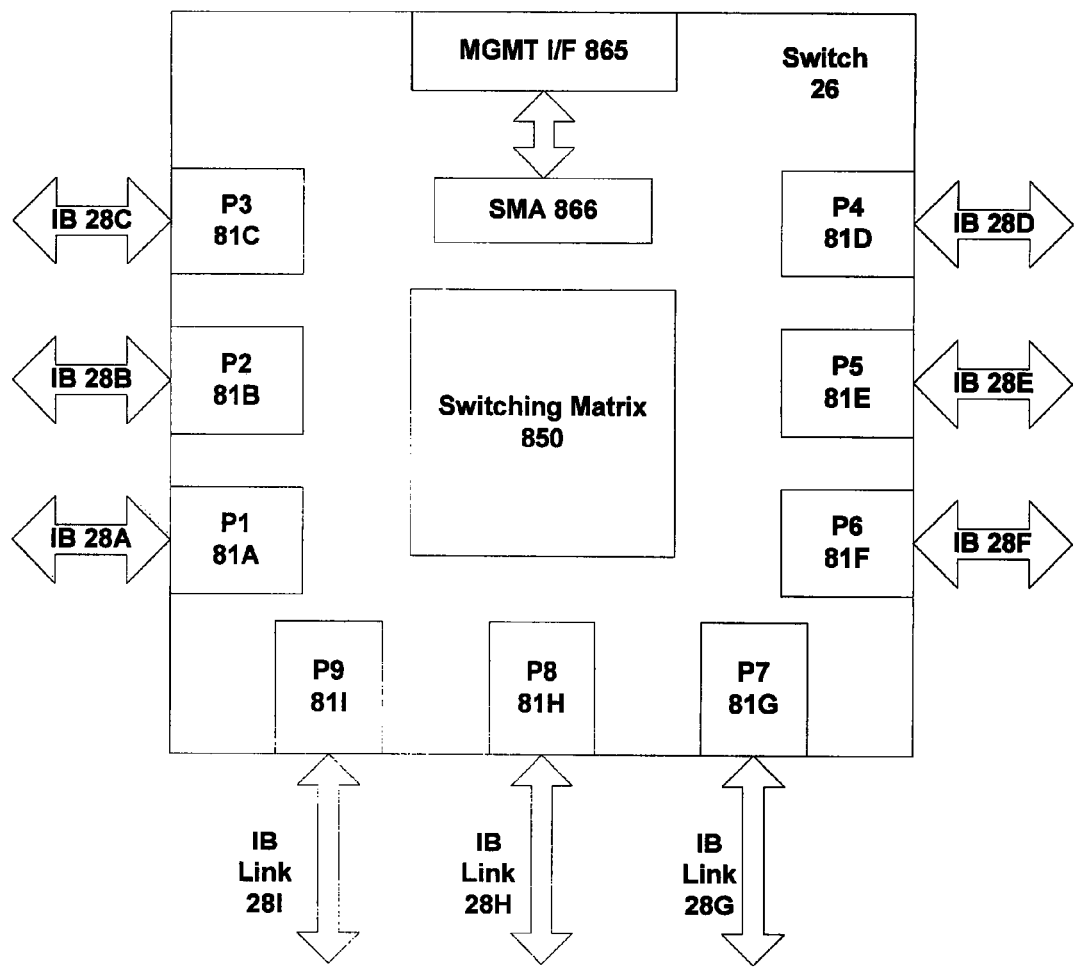
FIG. 10 is a schematic block diagram showing an example of a switch suitable for use in an Infiniband™ network.

FIG. 10 illustrates an example of a switch 26 suitable for use in an Infiniband fabric 12. Switch 26 can be implemented as a semiconductor device, for example an application specific integrated circuit (ASIC), and includes a management control interface 865, a subnet management agent (SMA) 866, multiple ports 81, and a switching matrix 850.

The management interface 865 provides access to the switch 26 for one or more external control systems, and can be used to configure switch 26 as appropriate depending upon the circumstances. For example, the subnet management agent 866 can communicate with the subnet manager 34 (see FIG. 4) via management interface 865.

In the present example, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability, and comprising one, four or twelve physical lanes. Each physical lane provides a basic data rate of 2.5 GHz, so that switch 26 provides connectivity for a total of 96 (9×12) lanes. The physical lanes into any given port are managed as a single logical link, and can be flow controlled using a credit-based link level flow control, as described above.

In accordance with the Infiniband Architecture, each link 28 can be subdivided into a maximum of sixteen virtual lanes (VL) to provide logically separate channels that are multiplexed onto a single logical link. The first fifteen virtual lanes (denoted VL0 through VL14) support general purpose data communications, while the remaining virtual lane (denoted VL15) is used for special management purposes. (Note that virtual lane VL15 is not flow-controlled, and so should be considered as not reliable). An Infiniband switch must support at least two virtual lanes on each link (i.e. data lane VL0 and management lane VL15). In one example, switch 26 supports four virtual lanes for general data communication plus one virtual lane for management purposes (VL15).

In accordance with the Infiniband Architecture, a packet can be specified as having one of sixteen different service levels (SLs). The service level for a particular packet is specified in the local route header (LRH), and remains constant as the packet transits an Infiniband subnet. The SL value in the packet determines the virtual lane over which the packet is transmitted across any given link in the subnet. This is achieved by having a switch maintain a set of SL-to-VL mappings (which are specific to each input port/output port combination). The SL-to-VL mappings are initialized and maintained by the subnet manager 34 (see FIG. 4).

On receipt of an incoming packet, a port first determines the output port to forward the packet to, based on the DLID value in the packet (as explained in more detail below). The port then uses the SL-to-VL mappings to decide the virtual lane over which the packet should be sent, given the SL value in the packet and the output port from which the packet will be transmitted. Note that since different switches may support different numbers of virtual lanes, a packet may be assigned to different virtual lanes for different links of its journey across a subnet.

The range of service levels can be used to provide a quality of service (QoS) mechanism in an Infiniband network. Thus any given virtual lane can be classified as low priority or high priority, and assigned a weight within that classification. The weight and classification of a virtual lane control its access to the bandwidth of the physical link, relative to the other virtual lanes supported over the same link. The service level of a packet then determines the virtual lane utilised by the packet over the link, in accordance with the SL-to-VL mappings. These mappings can be configured to reflect the number of virtual lanes provided by any given link and also the quality of service policy of the network.

The Infiniband Architecture supports the concept of partitioning in order to provide logical isolation of components sharing the same subnet. All nodes included in a route from a source to a destination must share the same 16-bit partition key (PK), otherwise they are unable to communicate with one another (or even to recognise each other's existence). An individual node may support multiple partition keys, and so belong to multiple different partitions.

A member of a partition can be denoted as a full member or a limited (partial) member, dependent on the high-order bit of the partition key. A full member can communicate with either a limited member or a full member, but a limited member cannot communicate with another limited member of that partition (only a full member). This model corresponds to a client-server architecture, where servers are full members and clients are partial members, and clients do not need generally to talk directly to one another.

Each queue pair at an end node has a partition key table which is assigned to it by the subnet manager 34 (see FIG. 4). A queue pair is assigned an index into the partition key table, and can then use this index to obtain and store the appropriate partition key into the local route header (LRH) for each outgoing packet. Conversely, a queue pair receiving a packet checks that the Pkey value within the incoming packet matches the indexed Pkey value in the Pkey table (if not, the incoming packet is discarded).

Each port 81 on switch 26 is provided with an input buffer (not shown in FIG. 10). The input buffer receives data arriving at a port 81 over its respective link 28, and stores this data pending transfer through the switching matrix 850. In the example mentioned above, each input buffer is divided into four sections, corresponding to the four virtual lanes on the associated link 28. This ensures that data from different virtual lanes is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e. the traffic through the switch) rises.

As part of the start-up procedure of an Infiniband network, the subnet manager 34 (see FIG. 4) assigns each end-node port in a subnet a local identifier (LID). Note that the individual ports 81 in switch 26 are not assigned their own LIDs, although an LID is assigned to port 0 of switch 26, which can be regarded as corresponding to management interface 865. (The switch management port, i.e. port 0, is considered an end-node in the Infiniband network, unlike the other switch ports).

Each LID comprises two portions, a base LID and a number of path bits. The number of path bits in the LID for a given port is determined by the LID mask count (LMC), which is also assigned by the subnet manager 34. Each packet in transit on the subnet contains the LID of the port from which it originated, namely the source LID (SLID), and also the LID for the port to which the packet is going, namely the destination LID (DLID). The SLID and the DLID are incorporated into the local route header (LRH) of the packet.

When a packet is received at its destination, the port checks that the DLID in the packet matches the LID for that port. Note that in this comparison the path bits of the LID are masked out, so that in effect the comparison is made against the base LID for the port. Thus for the purpose of destination checking, the path bits are ignored. However, in terms of routing a packet through a switch, the path bits are taken into consideration. This then allows multiple paths to be specified that all arrive at the same destination port. The ability to provide multiple paths through a subnet to the same destination port aids robustness and reliability within the network.

As mentioned above, Infiniband uses an "absolute" credit based flow control system for transfer over a link. The implementation of the flow control procedure within an Infiniband device can greatly influence the data carrying efficiency of an Infiniband link.

Figure 11:
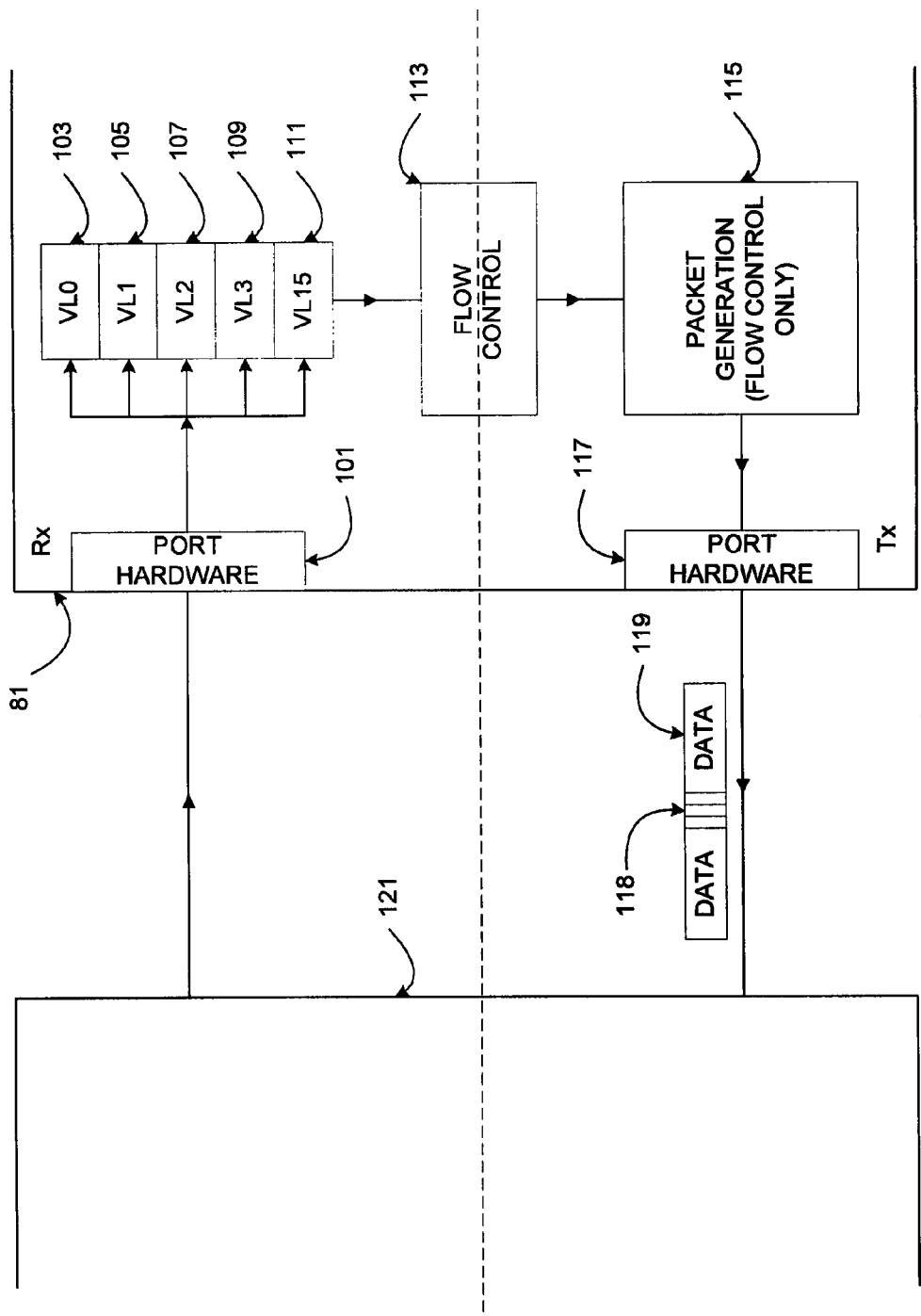
FIG. 11 is a schematic representation of flow control arrangements within the switch of FIG. 10.

As shown in FIG. 11, a switch port 81 of an Infiniband switch is operable to both receive (Rx) and transmit (Tx) packets. On the Rx side, packets are received at the port by port receive hardware 101. This port hardware 101 performs the recovery of the data from the signal, including deserialisation of the link data stream, decoding from the 10 bit transmission encoding to the 8 bit+control data and deskewing between data received over different lanes of the link. Thus data received over the link is transferred to input buffers at the port. In the present example, one input buffer is provided for each virtual lane (VL) operated over the link. Thus, in the present example, buffer 103 serves VL0, buffer 105 serves VL1, buffer 107 serves VL2, and buffer 109 serves VL3, additionally, buffer 111 is provided for the management lane VL15.

In order to notify a remote Infiniband device 121 of available buffer space in the port 81, transmit credit is sent to the remote device 121 via the transmit part of the port 81. This is achieved by multiplexing flow control messages 118 to the remote device 121 into the stream of data packets 119 being sent from the Tx side of the port 81. The flow control messages can include data describing a transmit credit limit for a given VL of the port 81, thus specifying the amount of data which can be transmitted over that VL, and can also include data describing total bytes. The total bytes is the total number of 64 byte blocks sent from port 81. This can be used by the remote device 121 as a reference in the flow control calculations, as set out in the Infiniband specification.

The Infiniband specification sets out a timer-based system for transmitting flow control messages between remote devices. Thus a flow control message is sent at a predetermined time interval to advertise available receive capability at the switch port 81. Failure to transmit a flow control message at this time interval can cause the remote device to enter an error state and attempt to re-establish communication over the link on the basis that the port 81 has failed to send a flow control packet and therefore is not operating correctly.

In the present example, each buffer 103, 105, 107, 109, 111 has a size of 4 kbytes, i.e. two times the maximum packet size allowed in Infiniband. As will be appreciated, when an input buffer is less than totally full, there is a possibility for more data to be received. However, if a buffer is totally full, then no more data can be received over that VL until the buffer has been at least partially emptied. Flow control messages sent from the port 81 to the remote device 121 can therefore advertise transmit credit to the remote device on the basis of the amount of available space in the buffer for a VL of the port Rx side.

Accurate and efficient advertisement of buffer credit to the remote device is important for a number of reasons. These include ensuring that received data amounts do not exceed the available buffer space, as this would cause data corruption at the receiving device. Also, silicon area is expensive, so it is advantageous to make the maximum use of buffer space provided as well as minimising the amount of buffer space provided. Additionally, overall speed of data transfer between two Infiniband devices can be affected.

It will therefore be appreciated that maximising the efficiency of the flow control is an important consideration to increase the overall efficiency of the link. Accordingly, the present example describes a method and apparatus which balances two conflicting requirements of advertising available transmit credit as soon as it becomes available whilst minimising the number of advertisement messages sent to the remote device to minimise the interruption to transmission of data to the remote device by the flow control packets.

Accordingly, in the present example, the available space in each VL buffer 103, 105, 107, 109, 111 is made available to a flow control manager 113. The flow control manager can monitor buffer usage over time and monitor readout rates from the buffers. The flow control manager 113 provides relevant flow control information to the packet generation unit 115. The packet generation unit 115 operates only from a flow control perspective, data packets are generated further back in the data transmit path, and may not be generated in the device containing the port 81, but in an originator device of the data in the packet or in a packet consolidator device between the originator device of the data in the packet and the device containing the port 81. The packet generation unit 115 thus generates flow control message packets and intersperses them between data packets as required. Finally, the data packets and flow control message packets are transmitted using port transmit hardware 117, which includes pre-transmission encoding and serialisation of the packets.

When traffic flows between the two devices, the state of the link will vary and can be categorised as follows for each Virtual Lane (VL) of the link. State 1: packets being received but input buffers are not filling up (for a switch: transmit bandwidth>=receive bandwidth). State 2: packets being received and input buffers filling up but not yet full (for a switch: transmit bandwidth<=receive bandwidth). State 3: queues full and no packets being received. State 4: queues are being emptied, but no packets are being received because the transmitter is awaiting credit. State 5: packets are being received, but at a rate allowing the input buffers to be emptied. State 6: the buffer is empty and no packets are being received.

In order to maximise the efficiency of the flow control, the present example implements a three part flow control management scheme. The first part is the timer triggered flow control packet timing which satisfies the Infiniband specification requirement and prevents a remote device 121 from timing-out its watchdog timer and entering an error detected state. The second part is a received quantity triggered flow control system, and the third part is a buffer change quantity triggered flow control system.

The received quantity trigger works on the basis of the amount of data received from the remote device. This system is optimised for a situation of zero output contention, i.e. data is being removed from the input buffer to move to another part of the device having the port 81 as fast as that data is arriving over the link from the remote device 121. The flow control manager can thus send a flow control packet advertising credit at the optimal time to allow the data transfer to continue uninterrupted by credit running out at the remote device, but also minimising disruption to the counter flow of traffic from the port to the remote device. This trigger provides a good result in states 1, 2 and 5, but a poor result in states 3, 4 and 6.

The buffer change quantity trigger is optimised for a situation of high output contention, where the input buffer is often full or nearly full as data is not being read from the buffer due to unavailability of resources within the device containing the port 81. In order to keep data flowing over the link (to minimise output resource contention at the remote device) this system sets a minimum available space level and transmits a flow control packet advertising that available space as soon as that level is reached within the buffer. This trigger provides a good result in states 4 and 5, but a poor result in state 6.

The timer trigger provides a good result in states 3 and 6 where there is no change and therefore no urgent need for a flow control update. The presence of the other two trigger methods to cover dynamic buffer states allows the timer to be set to a longer time period than might be used in a system not using the two additional triggers, and could be set to be as long as is allowed by the Infiniband specification.

These three trigger methods are integrated into the flow control manager 113. The flow control manager 113 can therefore use the most appropriate of the received quantity trigger and the buffer change quantity trigger to match the requirements of each of the VL buffers, whilst ensuring that if no flow control message packets are sent due to either of those triggers, the timer trigger of the Infiniband specification is observed to meet time-out requirements. The flow control manager 113 can manage the flow control to each VL buffer separately, thus allowing different trigger methods to be used for each VL buffer, according to the particular circumstances of each individual buffer at any moment in time.

Threshold levels for switching between quantity received and buffer change level triggers can be set depending upon variety of factors. Amongst those which can be taken into account are, VL buffer size, link width (1x, 4x or 12x), expected or observed data traffic patterns, and contra-flow data rates (i.e. to the remote device). These concerns can be examined on a once-only basis, a once per time period basis or a real-time basis.

Through use of the three trigger methods, more efficient use of an Infiniband link can be achieved. One example of increased efficiency is that a time lag from an important change occurring (e.g. emptying of a buffer) to credit being advertised can be minimised. Also, link bandwidth used by flow control packets can be minimised as these are only sent when required.

Thus there has now been described a method and apparatus for efficiently implementing a flow control strategy for an Infiniband port. Thereby, an Infiniband link can be managed efficiently and accurately to maximise the data flow over the link, minimising output resource contention at a transmitting device, and maximising use of input resources at a receiving device. Thus an Infiniband fabric containing a device having such an apparatus or implementing such a method can have an improved overall performance.

As the skilled addressee will appreciate, different flow control methods can be applied at the two ends of an Infiniband link. Thus a device implementing the method of the above-described example can be connected to a device implementing a different flow control method without conflict.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An Infiniband port, comprising:
   a receiver device that includes an input buffer for storing received data,
   a flow control manager for detecting an available space in the input buffer, and
   a packet generator for generating a flow control packet to advertise available space in the input buffer to a transmitter device transmitting data for storage in the input buffer,
   wherein the flow control manager determines a correct time to trigger the packet generator to generate a flow control packet on the basis of at least one of a received quantity trigger for the input buffer and a buffer change quantity trigger for the input buffer;
   wherein when the flow control manager of the receiver device is operating on the basis of the received quantity trigger, the flow control manager determines a correct time to trigger the packet generator to generate a flow control packet that advertises available credit to the transmitter device to balance a rate at which the receiver is receiving data and a rate at which data is being removed from the input buffer; and
   wherein when the flow control manager of the receiver device is operating on the basis of the buffer change quantity trigger mechanism, the flow control manager determines a correct time to trigger the packet generator to generate a flow control packet that advertises available credit to the transmitter device when a predetermined available space threshold of the input buffer is reached.

2. The port of claim 1, wherein the port receives data over a plurality of different virtual lanes, one input buffer being provided for each virtual lane.

3. The port of claim 2, wherein the flow control manager detects an available space in each input buffer and triggers the packet generator to generate a flow control packet for each virtual lane input buffer independently of every other virtual lane input buffer.

4. The port of claim 1, wherein the flow control manager chooses between the trigger mechanisms on the basis of at least one of a current buffer status, a buffer size characteristic, a link width and a data traffic history.

5. The port of claim 1, wherein the flow control manager chooses between the received quantity trigger mechanism and the buffer change quantity trigger mechanism on the basis of at least one of a current buffer status, a buffer size characteristic, a link width and a data traffic history, whilst monitoring a timer trigger mechanism relative to a time-out threshold for a flow control packet generation.

6. The port of claim 1, wherein a flow control packet can advertise zero available space.

7. The port of claim 1, wherein the packet generator multiplexes a flow control packet into a stream of data packets for transmission to the transmitter device.

8. The port of claim 1, wherein the port is coupled to a transmitter device having a different flow control packet generation mechanism.

9. The port of claim 1, wherein when the flow control manager is operating on the basis of the received quantity trigger mechanism, the flow control manager triggers the packet generator to generate a flow control packet sufficiently often to prevent the input buffer from becoming emptied by a read-out process from the input buffer.

10. The port of claim 1, wherein when the flow control manager is operating on the basis of a timer trigger mechanism, the flow control manager triggers the packet generator to generate a flow control packet prior to a predetermined time-out threshold being reached.

11. An Infiniband device comprising the port of claim 1.

12. The device of claim 11, wherein the device is an Infiniband switch.

13. An Infiniband port, comprising:
    a receiving entity that includes a buffer for storing data received at the port;
    a flow control manager unit for monitoring the buffer and determining a correct time to transmit a flow control message to a transmitting entity of data received at the port;
    a packet generator unit for generating a flow control packet in response to an input from the flow control manager unit;
    wherein the flow control manager unit determines the correct time using at least one of a received quantity trigger mechanism and a change quantity trigger mechanism;
    wherein when the flow control manager of the receiver device is operating on the basis of the received quantity trigger, the flow control manager determines a correct time to trigger the packet generator to generate a flow control packet that advertises available credit to the transmitter device to balance a rate at which the receiver is receiving data and a rate at which data is being removed from the input buffer; and
    wherein when the flow control manager of the receiving entity is operating on the basis of the change quantity trigger mechanism, the flow control manager determines a correct time to advertise available space to the transmitting entity by triggering the packet generator to generate a flow control packet that advertises available credit to the transmitting entity when a predetermined available space threshold of the input buffer is reached.

14. The port of claim 13, wherein the flow control packet comprises an advertisement of an available transfer credit to the transmitting entity.

15. The port of claim 13, wherein the port receives data over a plurality of virtual lanes, the port comprising one buffer associated with each virtual lane, wherein the flow control manager unit monitors each buffer and determines a correct time to transmit a flow control message to a transmitting entity of data received at the port for each virtual lane, and wherein the packet generator unit generates a flow control packet for one of the buffers independently of generating a flow control packet for a different one of the buffers.

16. The port of claim 13, wherein the flow control manager unit chooses between the received quantity trigger mechanism and the change quantity trigger mechanism on the basis of at least one of a current buffer status, a buffer size characteristic, a link width or a data traffic history, whilst permanently implementing a timer trigger mechanism.

17. The port of claim 16, wherein the timer trigger mechanism operates to a predetermined time-out threshold within which a flow control messages must be generated.

18. The port of claim 13, wherein a flow control packet can advertise zero available space.

19. The port of claim 13, wherein the packet generator unit multiplexes a flow control packet into a stream of data packets for transmission to the transmitting entity.

20. The port of claim 13, wherein the port is coupled to a transmitting entity having a different flow control packet generation mechanism.

21. The port of claim 13, wherein when the flow control manager unit is operating on the basis of the received quantity trigger mechanism, the flow control manager unit triggers the packet generator unit to generate a flow control packet sufficiently often to prevent the buffer from becoming emptied by a read-out process from the buffer.

22. An Infiniband device comprising the port of claim 13.

23. The device of claim 22, wherein the device is an Infiniband switch.

24. An InfiniBand port, comprising:
 a receiving entity that includes:
  a buffer means for storing data received at the port;
  flow control manager means for monitoring the buffer means and determining a correct time to transmit a flow control message to a transmitting entity of data received at the port;
  packet generator means for generating a flow control packet in response to an input from the flow control manager means;
  wherein the flow control manager means determines the correct time using at least one of a received quantity trigger mechanism and a change quantity trigger mechanism; and
  wherein when the flow control manager means of the receiving entity is operating on the basis of the received quantity trigger mechanism, the flow control manager means determines a correct time to trigger the packet generator to generate a flow control packet that advertises available credit to the transmitter device to balance a rate at which the receiver is receiving data and a rate at which data is being removed from the input buffer;
  wherein when the flow control manager means of the receiving entity is operating on the basis of the change quantity trigger mechanism, the flow control manager means determines a correct time to advertise available space to the transmitting entity by triggering the packet generator to generate a flow control packet that advertises available credit to the transmitting entity when a predetermined available space threshold of the input buffer is reached.

25. A method for controlling flow of data to an Infiniband port, the method comprising:
 monitoring a status of an input buffer in a receiver device in the port;
 determining, on the basis of at least one of an amount received and a change quantity, a most appropriate time to generate a flow control message to send to an originator of data received at the port and stored in the buffer; and
 generating a flow control message to advertise available input buffer space to the originator;
 wherein for the received quantity, determining the appropriate time involves determining a time to generate a flow control packet that advertises available credit to balance a rate at which the receiver is receiving data and a rate at which data is being removed from the input buffer; and
 wherein for the change quantity, determining the appropriate time involves determining a time to generate a flow control packet that advertises available credit when a predetermined available space threshold of the input buffer is reached.

26. The method of claim 25, comprising choosing between a timer, the amount received and the change quantity on the basis of at least one of a time-out counter, a current buffer status, a buffer size characteristic, a link width and a data traffic history.

* * * * *

UNITED STATES PATENT AND TRADEMARK OFFICE
CERTIFICATE OF CORRECTION

| | | |
|---|---|---|
| PATENT NO. | : 8,964,547 B1 | Page 1 of 1 |
| APPLICATION NO. | : 10/863373 | |
| DATED | : February 24, 2015 | |
| INVENTOR(S) | : Rygh et al. | |

It is certified that error appears in the above-identified patent and that said Letters Patent is hereby corrected as shown below:

Title page, item (75) Inventors, line 3, delete "Langus" and insert -- Langhus --, therefor.

In the drawings

On sheet 2 of 7, in drawings, in figure 3, under Reference Numeral 13, line 1, delete "IAB" and insert -- IBA --, therefor.

Signed and Sealed this
Twentieth Day of October, 2015

Michelle K. Lee
*Director of the United States Patent and Trademark Office*